Oct. 7, 1952      J. D. CHRISTIAN      2,612,788

COMBINED SHAFT JOURNAL AND DRIVE UNIT

Filed Jan. 22, 1951      2 SHEETS—SHEET 1

INVENTOR:
Joseph Dennis Christian
BY Paul & Paul
ATTORNEYS.

Oct. 7, 1952 — J. D. CHRISTIAN — 2,612,788
COMBINED SHAFT JOURNAL AND DRIVE UNIT
Filed Jan. 22, 1951 — 2 SHEETS—SHEET 2
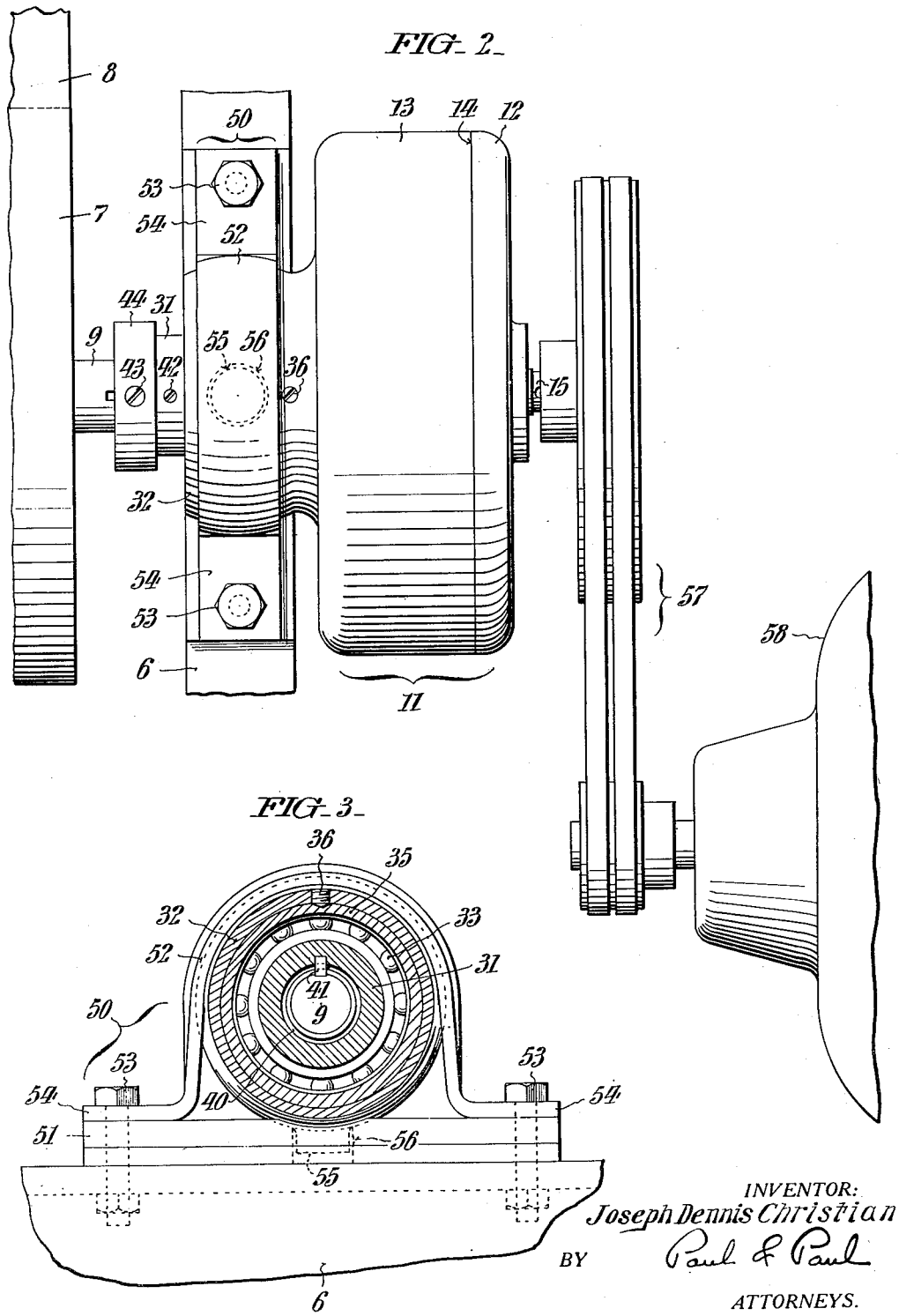
INVENTOR:
Joseph Dennis Christian
BY Paul & Paul
ATTORNEYS.

Patented Oct. 7, 1952

2,612,788

UNITED STATES PATENT OFFICE 2,612,788

COMBINED SHAFT JOURNAL AND DRIVE UNIT

Joseph Dennis Christian, San Francisco, Calif., assignor to The American Pulley Company, Philadelphia, Pa., a corporation of Pennsylvania Application January 22, 1951, Serial No. 207,170

6 Claims. (Cl. 74—421)

This invention relates to a combined shaft journal and speed change drive unit. More specifically stated, it is concerned with a unit which is adapted to serve both as a journal for one end of the shaft of a machine or apparatus to be driven, and as a speed change drive for the shaft.

Heretofore speed change devices, for example of the type disclosed in U. S. Patent 2,166,661 granted to me on May 3, 1938, were applied to and supported by the ends of the shafts beyond the corresponding end journal bearings of the machine.

To prevent bodily rotation of the devices about the shafts of the machines, the use of torque resisting arms had to be provided. These arms required for their accommodation, considerable space and made difficult their installation in close quarters.

The chief aim of my invention is to improve the mounting and reduce the space requirements and overall weight of such devices. This objective is realized in practice, as hereinafter more fully set forth, through the provision of a unitary structure which is designed to serve in lieu of one of the usual shaft journal bearings of the machine or apparatus, and in which an improved compact speed change gear mechanism is incorporated in such a way that the device is allowed a limited amount of universal movement to compensate for shaft flexure, and at the same time is held against bodily rotation about the shaft without necessitating the use of a restraining or torque arm or any other extraneous means for the purpose.

Other objects and attendant advantages will appear from the following description of the attached drawings wherein:

Fig. 2 is a fragmentary view showing the organization of Fig. 1 in top plan; and Fig. 3 is a fragmentary detail view in section taken as indicated by the arrows III—III in Fig. 1.

Figure 1:
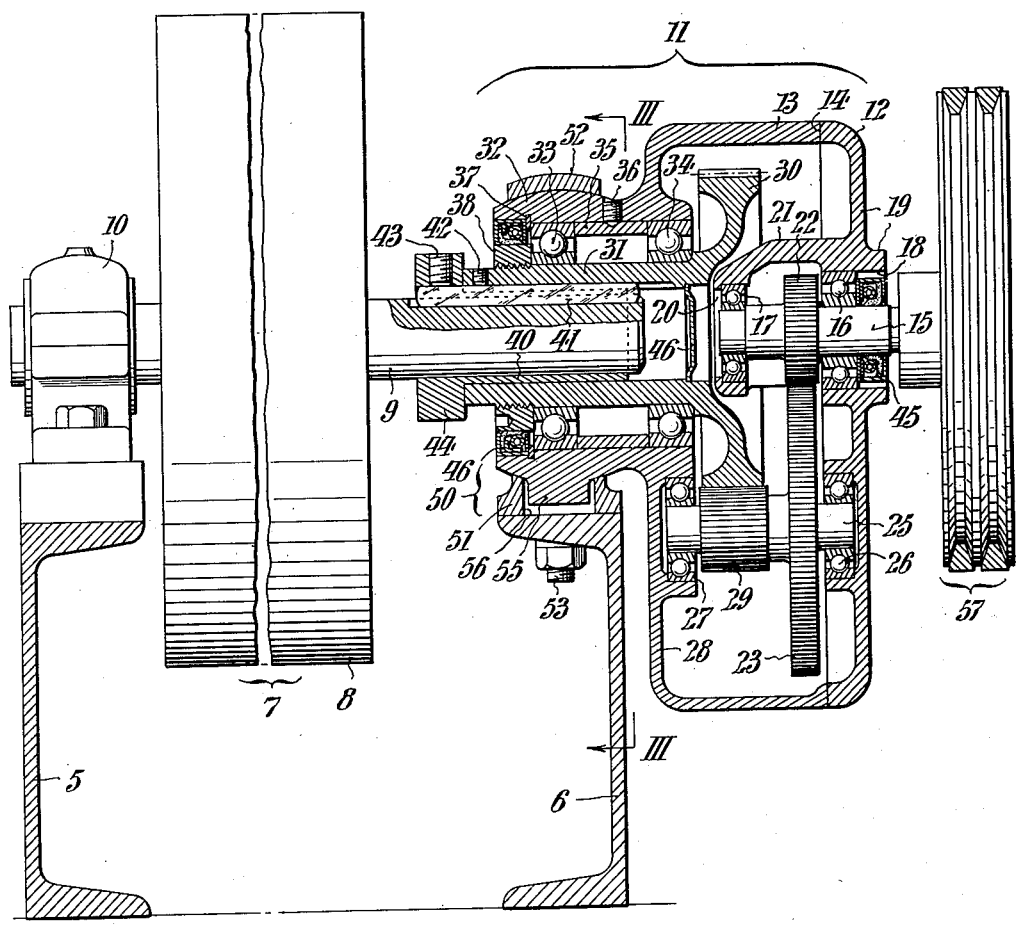
Fig. 1 is a broken out view in transverse section of a machine or apparatus in the form of a belt conveyer with a combined shaft journal and drive unit conveniently embodying my invention.

With more specific reference first more particularly to Fig. 1, the numerals 5 and 6 designate the top longitudinals of one of the side frames of the conveyer structure and the numeral 7, one of the end drums or pulleys about which the belt 8 runs. Ordinarily, the pulley shaft 9 is journalled at opposite ends in bearing blocks such as the one shown at 10.

The combination shaft journal and drive unit with which the present invention is directly concerned, is comprehensively designated 11 and, as will be presently seen, serves in the place of one of the usual bearings of the shaft 9 of the conveyer apparatus. Except as later pointed out, the device 11 is generally similar to the one disclosed in my patent hereinbefore referred to in that it has a casing formed by two complemental sections 12 and 13 which abut in the plane 14, and which are detachably held together by means of screw bolts (not illustrated). In accordance with the present invention, the power input shaft 15 of the device 11 is rotatively supported by ball bearings 16 and 17 respectively set into an opening 18 in the side wall 19 of the casing section 12, and into an aligned opening 20 in a web 21 extending inwardly from said wall. Affixed to the input shaft 15 in the interval between the bearings 16 and 17, is a toothed pinion 22 which meshes with a toothed gear 23 on a countershaft 25 whereof the ends are journalled in bearings 26 and 27 respectively recessed into the side wall 19 of casing section 12 and into the side wall 28 of casing section 13. Through a toothed pinion 29 alongside the gear 23 on countershaft 25, rotary motion is transmitted to an intermeshing toothed wheel 30 on the output shaft 31 of the unit 11. It is to be noted that the shaft 31 is coaxial with the input shaft 15 and integrally formed with said wheel 30, which latter is dished in cross section to accommodate the web extension 21 on the casing section 12. Due to this improved construction and arrangement, the enclosed parts are brought into close relation and require but a minimum amount of space for their accommodation, the unit as a whole being thereby rendered more compact and hence lighter in weight as compared with my prior patented speed change device. The output shaft 31 extends to the exterior through a comparatively long laterally-projecting boss 32 on the end wall 28 of casing section 13, and is rotatively supported in suitable well-spaced anti-friction bearings 33 and 34 which, for example, may be of the ball type as shown, and which are fitted into the bore of said boss. Also as shown, the bearings 33, 34 are separated by a spacer ring 35 fixed both against rotation and axial shifting by a set screw 36. A split spring ring 37, engaged within a circumferential groove internally of the bore in the boss 32, is relied upon to hold the bearings 33 and 34 in place. The output shaft 31 is maintained in assembly by a stop collar 38 which threadedly engages said shaft and abuts the inner face of the bearing 33. For a purpose later on explained, the outer surface of the boss 32 is made spherical. As further shown, the output shaft 31 is hollow, and disposed within it is a longitudinally split sleeve 40 which is bored to fit telescopically over the drive end of the pulley shaft 9 of the conveyer apparatus. A key 41, engaged in registering slots respectively in the shaft 9 and in the output shaft 31 of the device, positively connects these shafts for rotation together. The key 41 is secured against displacement by set screws 42 and 43 respectively in the hollow output shaft 31 and in a flange head 44 at the outer end of the sleeve 40. If a certain amount of relative axial movement should be desired, the set screw 42 may be omitted and the key 41 otherwise fixed against endwise shifting in respect to shaft 9. In practice, the casing of the device 11 is partly filled with lubricating oil or grease which is prevented from escaping by sealing collars 45 and 46 disposed within the outer ends of the bearing openings in the casing sections 12 and 13 through which openings the input and output shafts 15 and 31 extend, and also by a disk 46 force-fitted into the hollow of the output shaft adjacent its inner end.

Also incorporated in my improved shaft journal and drive unit is a bearing support in the form of a bracket 50 of which the bore is made spherical to receive the boss 32 of the device 11 with a snug working fit. As shown, the bracket 50 is of multipartite construction, said bracket comprising a lower or base component 51 and a top or strap component 52 which meet in a horizontal plane through the axis of the boss 32. Obviously the bearing bracket 50 may be otherwise split to make insertion of the boss 32 possible, as well as otherwise secured to the framework of the machine to be driven. In the present instance, the bearing bracket 50 is secured in place by screw bolts 53 passed through pre-allocated registering apertures respectively in the laterally projecting feet 54 of the top component, in the ends of the base component 51, and in the top flange of the channel beam 6 of the conveyer apparatus. Bodily rotation of the device 11 about the axis of the pulley shaft 9 is prevented, in accordance with my invention, by a radial lug 55 on the boss 32 which lug extends down into a somewhat larger central aperture 56 in the base component 51 of bracket 50.

Power may be applied to the input shaft 15 of the device 11 in any suitable or convenient way, for example as shown in Fig. 2, through a multiple belt and pulley connection 57 from an electric motor 58.

In the illustrated instance, the proportioning of the gears 22, 23 and 29, 30 of the two sets is such that the pulley shaft 9 will be driven at a speed considerably reduced from that of the input shaft 15. As already pointed out, bodily rotation of the device about the axis of shaft 9 is prevented through cooperation of the lug 55 on the projecting boss 32 of the casing with the opening 56 in the base members 51 of the bracket 50. However, since the opening 56 is somewhat larger than the lug 55, the device 11 is supported with capacity for limited universal play, by reason of the spherical inter-engagement of the boss 32 of its casing within the bracket 50, to compensate for any flexure of the shaft 9 which may be occasioned by lateral pull of the drive belts 57. The extended boss 32 on the casing permits the use of a longer output shaft 31 than would otherwise be possible, to embrace a correspondingly greater length of the pulley shaft 9 and thus provides a stronger coupling connection between these two shafts. Moreover, by virtue of the new construction and the compact design of the casing and the enclosed parts, the device 11 has less overhang and therefore imposes correspondingly less outboard weight leverage beyond the region of its support. Accordingly, under these conditions, flexure of the driven pulley shaft 9 will be practically negligible, with consequent avoidance of undue strains therein and binding thereof in the bearing block 10.

It is to be understood that the various gears embodied in the device may be either of the plain spur variety or they may be of the helix angle, helical or of the herringbone types, and moreover, that they may be proportioned for speed increase transmission rather than for speed reduction if desired, without departing from the spirit of my invention.

Having thus described my invention, I claim:

1. In a combined substitute shaft bearing and drive unit, a powered speed change device having a casing with a lateral projection at one side thereof, an output shaft extending through the projection for telescopic connection to one end of the shaft of a machine to be driven, a pair of longitudinally-spaced bearings for said output shaft within said projection; a powered input shaft extending through another part of the casing, and speed change gear connections within the casing between said output and input shafts; and a bracket with means for securing it to a frame portion of the machine in which the lateral projection on the casing is engaged for support of the unit cantilever fashion with capacity for limited universal movement of the unit incident to flexure of the driven shaft.

2. A combined substitute shaft bearing and drive unit, according to claim 1, further including means operative between the support and the unit to prevent bodily rotation of the latter about the shaft of the machine.

3. A combined substitute shaft bearing and drive unit, according to claim 1, wherein the lateral projection on the casing of the unit is spherical and engaged with a snug working fit in a correspondingly-configured bore in the bracket.

4. A combined substitute shaft bearing and drive unit, according to claim 1, wherein the lateral projection on the casing of the unit is spherical and engaged with a snug working fit in a correspondingly configured bore in the bracket; and further including a radial lug on the projection of the casing of the unit loosely engaged in an aperture in the bracket to prevent bodily rotation of said unit about the driven shaft.

5. A combined substitute shaft bearing and drive unit, according to claim 1, wherein the input shaft is axially aligned with the output shaft; wherein the input shaft is rotatively supported in an opposite side wall of the casing and also in a fixed bearing internally of the casing spaced from said opposite side wall; and wherein the gearing includes a gear wheel on the input shaft in the zone between the wall and said internal bearing, an intermeshing gear wheel on a parallel shaft within the casing, and a second gear wheel on the parallel shaft in mesh with a gear wheel on the inner end of the output shaft, the latter gear wheel being axially dished to clear the internal bearing for the input shaft.

6. A combined substitute shaft bearing and drive unit, according to claim 1, wherein the lateral projection on the casing of the unit is spherical and engages with a snug working fit in a correspondingly configured bore in the bracket and wherein the support is split with its components meeting in a plane through the axis of the spherical projection on the casing of the unit.

JOSEPH DENNIS CHRISTIAN.

REFERENCES CITED

The following references are of record in the file of this patent:

UNITED STATES PATENTS

| Number | Name | Date |
|---|---|---|
| 1,575,252 | Carter | Mar. 2, 1926 |
| 1,634,507 | Morison | July 5, 1927 |
| 1,921,296 | Harkness | Aug. 8, 1933 |
| 2,027,149 | Christian | Jan. 7, 1936 |
| 2,108,367 | Christian | Feb. 15, 1938 |

FOREIGN PATENTS

| Number | Country | Date |
|---|---|---|
| 417,279 | Great Britain | Oct. 2, 1934 |